(12) United States Patent
Doble et al.

(10) Patent No.: US 8,701,694 B2
(45) Date of Patent: Apr. 22, 2014

(54) MOUNT FOR INLET CHECK VALVE

(75) Inventors: Cory J. Doble, West Harrison, IN (US);
Paul C. Wetzel, Oxford, OH (US);
Jason M. Crawford, Connersville, IN (US)

(73) Assignee: Stant USA Corp., Connersville, IN (US)

( * ) Notice: Subject to any disclaimer, the term of this patent is extended or adjusted under 35 U.S.C. 154(b) by 237 days.

(21) Appl. No.: 13/415,736

(22) Filed: Mar. 8, 2012

(65) Prior Publication Data

US 2012/0227829 A1 Sep. 13, 2012

Related U.S. Application Data

(60) Provisional application No. 61/451,457, filed on Mar. 10, 2011.

(51) Int. Cl.
*F16L 55/10* (2006.01)

(52) U.S. Cl.
USPC .......................................... 137/15.09; 137/592

(58) Field of Classification Search
CPC ....................................................... B60K 15/04
USPC ......................... 137/15.09, 527.4, 527.6, 592
See application file for complete search history.

(56) References Cited

U.S. PATENT DOCUMENTS

| | | | |
|---|---|---|---|
| 5,056,570 A | 10/1991 | Harris et al. | |
| 5,271,438 A | 12/1993 | Griffin et al. | |
| 5,668,828 A | 9/1997 | Sanderford, Jr. et al. | |
| 5,730,194 A | 3/1998 | Foltz | |
| 6,056,029 A | 5/2000 | Devall et al. | |
| 6,305,408 B1 * | 10/2001 | Goto et al. | 137/351 |
| 6,932,100 B2 * | 8/2005 | Martin et al. | 137/15.18 |
| 7,147,001 B2 | 12/2006 | Gamble | |
| 7,458,391 B2 * | 12/2008 | Krishnamoorthy et al. | 137/527.4 |
| 7,568,499 B2 * | 8/2009 | Kishi et al. | 137/527.6 |
| 8,316,881 B2 * | 11/2012 | Yamaguchi | 137/515.5 |
| 2005/0028873 A1 * | 2/2005 | Martin et al. | 137/592 |
| 2005/0067027 A1 * | 3/2005 | Kaneko | 137/592 |
| 2005/0184515 A1 * | 8/2005 | Isayama et al. | 285/288.1 |
| 2011/0284126 A1 | 11/2011 | Gamble et al. | |

* cited by examiner

*Primary Examiner* — John Rivell
*Assistant Examiner* — Reinaldo Sanchez-Medina
(74) *Attorney, Agent, or Firm* — Barnes & Thornburg LLP

(57) ABSTRACT

A fuel system includes a fuel tank filler neck associated with a fuel tank. The fuel tank filler neck includes a fill tube for receiving a fuel-dispensing pump nozzle and a fuel conductor interconnecting an interior region of the fuel tank and a passageway formed in the fill tube.

18 Claims, 4 Drawing Sheets

MOUNT FOR INLET CHECK VALVE

PRIORITY CLAIM

This application claims priority under 35 U.S.C. §119(e) to U.S. Provisional Application Ser. No. 61/451,457, filed Mar. 10, 2011, which is expressly incorporated by reference herein.

BACKGROUND

The present disclosure relates to a fuel system, and particularly to a fuel-delivery control system. More particularly, the present disclosure relates to a fuel tank valve apparatus comprising a fuel tank filler neck and an inlet check valve for regulating flow of liquid fuel and fuel vapor through the fuel tank filler neck.

A filler neck conducts liquid fuel from a fuel-dispensing pump nozzle to an interior fuel-storage region in a fuel tank. Although an opened passageway through the filler neck into the fuel tank is needed during refueling to conduct liquid fuel from the pump nozzle into the fuel tank, it is desirable to close the filler neck at other times to block discharge of liquid fuel and fuel vapor from the fuel tank through the filler neck. In many cases, a fuel cap is mounted on an outer end of the filler neck to close the filler neck during the time period before and after each tank refueling activity.

SUMMARY

According to the present disclosure, a fuel system comprises a fuel tank filler neck including a fuel conductor that is adapted to extend into an interior fuel-storage region of a fuel tank through an inlet aperture formed in the fuel tank. The fuel conductor includes a tubular housing and an inlet check valve apparatus.

In illustrative embodiments, the tubular housing is formed to include a fuel-transfer channel arranged in illustrative embodiments to receive liquid fuel flowing through a fill tube also included in the fuel tank filler neck and coupled to the fuel conductor. The inlet check valve apparatus includes a valve that is mounted for movement relative to a downstream end of the tubular housing to open and close a downstream fuel-discharge aperture opening into the fuel-transfer channel and communicating with the interior fuel-storage region of the fuel tank.

In illustrative embodiments, the fuel conductor further includes a tank mount comprising a spud anchor and a separate spud configured to be fastened to the spud anchor and adapted to be coupled to a fuel tank and a fill tube associated with the fuel tank. The spud anchor is coupled to a middle portion of the tubular housing to lie in a stationary position on the tubular housing in an illustrative assembly and installation process in accordance with the present disclosure. The spud is configured to be fastened to the spud anchor and adapted to mate with the fuel tank and formed to include a central channel sized to receive an upstream end of the tubular housing therein.

The spud is mounted on an upstream end of the tubular housing and coupled to the spud anchor to lie in a fixed position on the upstream end of the tubular housing an assembly process in accordance with the present disclosure. The spud is configured to (1) mate with the fuel tank to support the tubular housing in a proper stationary position in the inlet aperture formed in the fuel tank and (2) mate with a fill tube included in the filler neck.

In illustrative embodiments, the spud anchor comprises an O-ring seal made, for example, of nitrile rubber (NBR) and a ring-shaped retainer made, for example, of stainless steel. The spud anchor is coupled to a tubular housing made of polyoxymethylene (POM) to establish a mechanical joint and a fluid-leak barrier between the tubular housing and the spud anchor. The spud is made of high-density polyethylene (HDPE) in an illustrative embodiment.

The spud is pressed onto the tubular housing to cause the upstream end of the tubular housing to pass through the central passage formed in the spud until the spud mates with the stationary spud anchor coupled to the tubular housing. In illustrative embodiments, the retainer is insert-molded into the tubular housing to create a mechanical lock between the retainer and the tubular housing.

The O-ring seal is either installed or overmolded onto an exposed portion of the insert-molded retainer to provide means for establishing a fluid-leak barrier between the spud and the spud anchor when the spud is later coupled to the tubular housing and the spud anchor. A lock portion of the spud is deformed while the spud is mounted on the upstream end of the tubular housing to create a mechanical lock between the spud and the spud anchor and compress the O-ring on the retainer between the spud and the retainer.

The downstream end of the tubular housing carrying the inlet check valve apparatus is inserted into the interior fuel-storage region of the fuel tank through the inlet aperture formed in the fuel tank. A downstream end of the spud is coupled to the fuel tank using any suitable means (e.g., welding) to retain the tubular housing in a fixed position relative to the fuel tank. The fill tube is coupled to the spud to cause a fuel-conducting passageway formed in the fill tube to lie in fluid communication with the fuel-transfer channel formed in the tubular housing.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
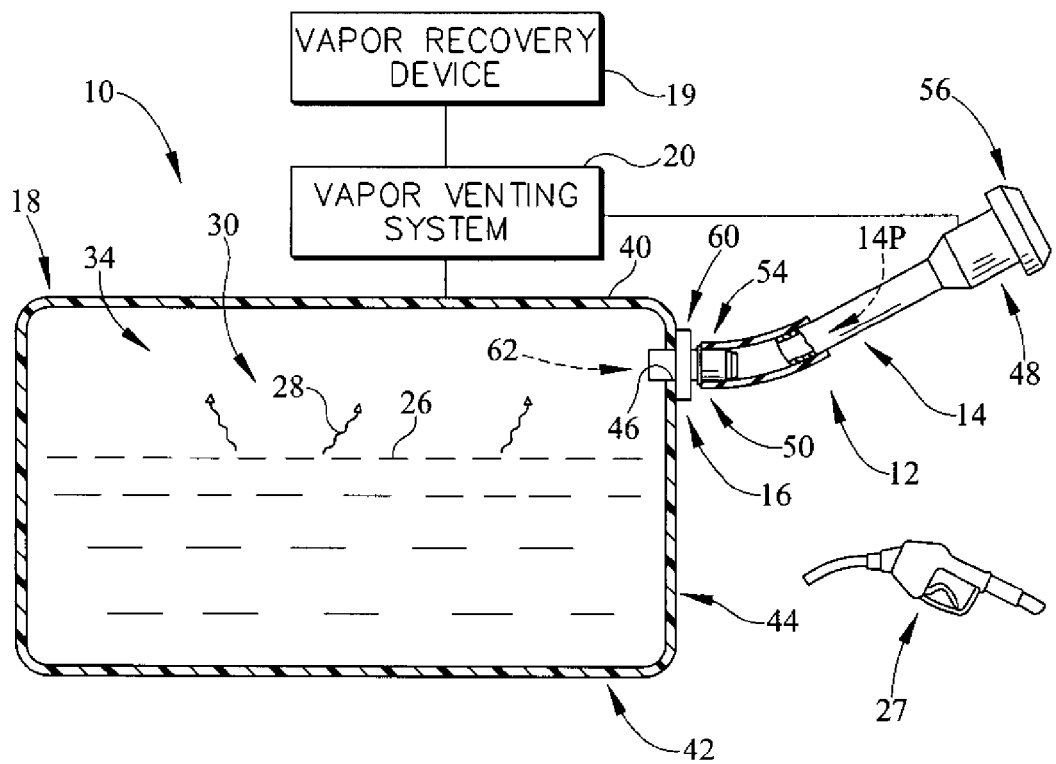
FIG. 1 is a diagrammatic view of a vehicle fuel system having a filler neck coupled to the fuel tank and showing that the filler neck includes a fill tube and a fuel conductor in accordance with the present disclosure interposed between and coupled to the fuel tank and the fill tube.
Figure 1A:
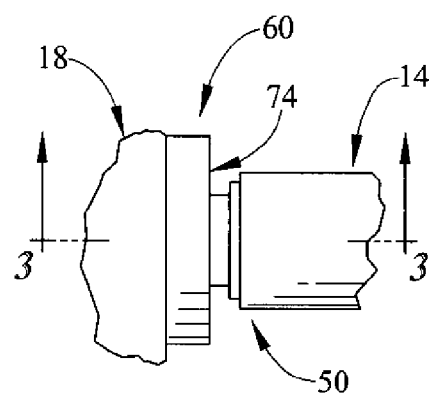
FIG. 1A is an enlarged partial view of the fuel conductor of FIG. 1.

A fuel system 10 for use with a vehicle is shown in FIG. 1. Fuel system 10 includes a fuel tank 18, a vapor-venting system 20 coupled to fuel tank 18 and to a vapor-recovery device 19, and a filler neck 12. Filler neck 12 includes a fill tube 14 and a fuel conductor 16 coupled to fill tube 14 and to fuel tank 18 and to intercept and conduct liquid fuel flowing through fill tube 14 into fuel tank 18.

Fuel conductor 16 includes a tubular housing 70, an inlet check valve apparatus 62, and a tank mount 71 coupled to an exterior portion of tubular housing 70 and adapted to mate with an exterior surface of fuel tank 18 to support tubular housing 70 in a position extending into an interior fuel-storage region 30 formed in fuel tank 18 through an inlet 46 formed in fuel tank 18 and locating inlet check valve apparatus 62 in fuel tank 18 near inlet aperture 46 as suggested in FIG. 1.

Fill tube 14 conducts liquid fuel 26 to fuel conductor 16 which regulates the flow of liquid fuel 26 and fuel vapor 28 between fill tube 14 and an interior fuel-storage region 30 of fuel tank 18. Vapor venting system 20 regulates venting of fuel vapor 28 extant in a vapor space 34 in interior fuel-storage region 30 of fuel tank 18 to vapor-recovery device 19 located outside of fuel tank 18.

Fuel tank 18 includes a top wall 40, a bottom wall 42 spaced apart from top wall 40, and a side wall 44 formed to include an inlet aperture 46 as shown, for example, in FIG. 1. Fuel conductor 16 is mounted to side wall 44 and arranged to extend or be extended through inlet aperture 46 as shown in FIG. 1. Fill tube 14 includes a mouth 48 at an outer end and a discharge outlet 50 at an inner end. Fuel conductor 16 has an outer end 54 (defined by tank mount 74) coupled to discharge outlet 50 of filler neck 14 and an inner end 52 (defined by tubular housing 70) arranged to extend into interior fuel-storage region 30 of fuel tank 18. Inlet check valve apparatus 62 is mounted on inner end 52 of tubular housing 70 and includes a pivotable closure 61 as suggested in FIGS. 3 and 4. Mouth 48 is formed to receive a fuel-dispensing pump nozzle 27 during tank refueling and a closure 56 at all times other than refueling.

Figure 3:
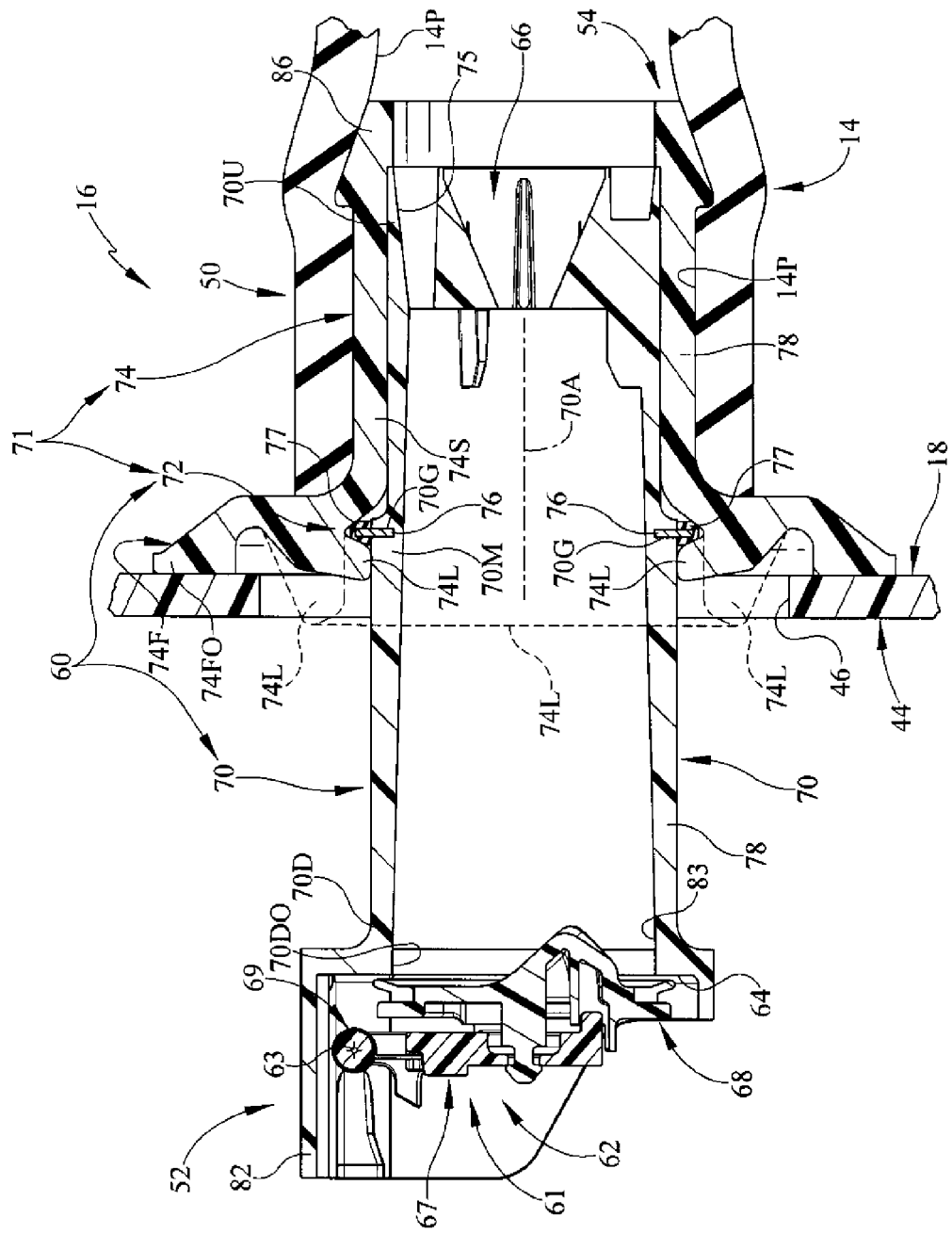
FIG. 3 is a cross-sectional view of the fuel tank, fuel conduit, and filler neck of FIG. 1 showing the flapper-door valve in the closed position and suggesting that the tubular housing and the spud anchor cooperate to form a valve carrier on which inlet check valve apparatus is mounted and that the spud is fastened (e.g., welded) to both of the spud anchor and the fuel tank to fix the tubular housing in a stationary position relative to the fuel tank and coupled to a downstream end of the fill tube of FIG. 1.
Figure 4:
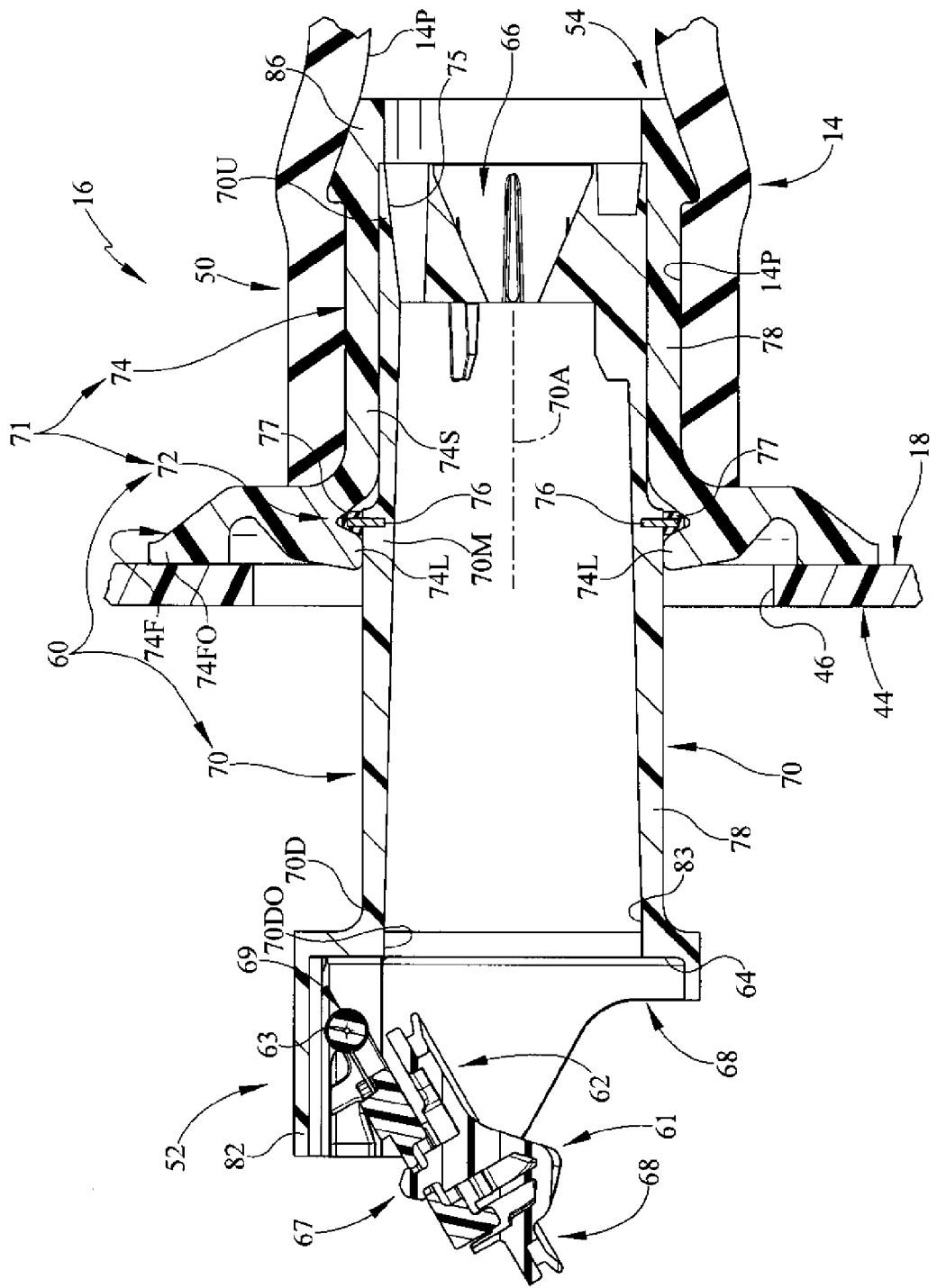
FIG. 4 is a view similar to FIG. 3 showing the flapper-door valve in an opened position during refueling to allow liquid fuel flowing through the fill tube and the fuel conduit to flow into the interior fuel-storage region formed in the fuel tank.

Fuel conductor 16 functions, for example, to conduct the flow of liquid fuel 26 into fuel tank 18 from fill tube 14 during tank refueling and to establish a barrier configured to block flow of liquid fuel and fuel vapor between fill tube 14 and fuel tank 18 at certain other times. Prior to refueling, fuel conductor 16 is configured to assume a closed state, as shown in FIG. 3. During refueling, fuel conductor 16 is configured to assume an opened state, as shown in FIG. 4, and conduct liquid fuel 26 dispensed into fill tube 14 into interior fuel-storage region 30 of fuel tank 18. After refueling, fuel conductor 16 is reconfigured to assume the closed state shown in FIG. 3.

Figure 2:
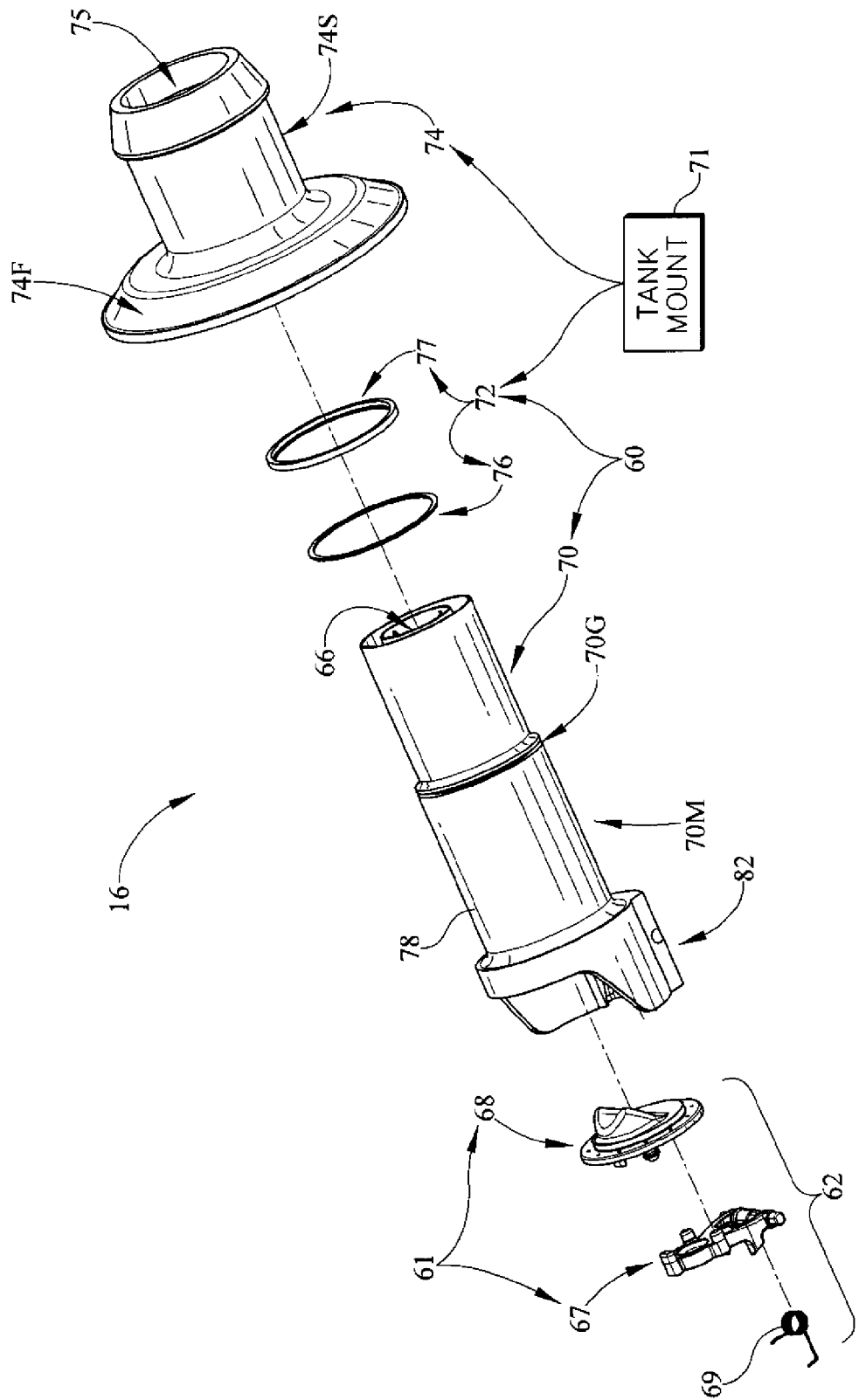
FIG. 2 is an exploded perspective assembly view of a fuel conductor in accordance with the present disclosure showing, in series, from right to left, a fill-tube connector spud, a spud anchor comprising an O-ring seal and a ring-shaped retainer and cooperating with the spud to form a tank mount, a tubular housing, and an inlet check valve apparatus comprising a flapper-door valve, a valve mover, and a valve-mover biasing spring.

In an illustrative embodiment shown in FIG. 2, fuel conductor 16 comprises a fill-tube connector spud 74 adapted to mate with fuel tank 18, a tubular housing 70, and a multi-part spud anchor 72. Tubular housing 70 has an upstream end 70U sized to extend through a central channel 75 formed in fill-tube connector spud 74. Spud anchor 72 comprises a retainer 76 adapted to be coupled to a middle portion 70M of tubular housing 70 and an O-ring seal 77 adapted to be coupled to an exposed portion of retainer 76. Tubular housing 70 and spud anchor 72 cooperate to form a valve carrier 60 as suggested in FIGS. 2 and 3.

Fuel conductor 16 further includes an inlet check valve apparatus 62 comprising a flapper-door valve 68, a valve mover 67, and a valve-mover biasing spring 69 as suggested in FIG. 2. Inlet check valve apparatus 62 is coupled to valve carrier 60 as suggested in FIG. 3. It is within the scope of the present disclosure to use any suitable inlet check valve apparatus on valve carrier 60.

Fuel tank filler neck 12 includes a fuel conductor 16 that is adapted to extend into an interior fuel-storage region 30 of a fuel tank 18 through an inlet aperture 46 formed in fuel tank 18. Fuel conductor 16 includes a tubular housing 70 formed to include a fuel-transfer channel 66 and an inlet check valve apparatus 62 including a closure 61 that is mounted for movement relative to a downstream end 70D of tubular housing 70 to open and close a downstream fuel-discharge aperture opening into fuel-transfer channel 66 and communicating with interior fuel-storage region 30 of fuel tank 18 as suggested in FIGS. 3 and 4.

Fuel conductor 16 further includes a tank mount 71 comprising a stationary spud anchor 72 coupled to a middle portion 70M of tubular housing 70 and a fill-tube connector spud 74 adapted to mate with fuel tank 18 and formed to include a central channel 75 sized to receive an upstream end 70U of tubular housing 70 therein. Fill-tube connector spud 74 is mounted on an upstream end of tubular housing 70 and coupled to spud anchor 72 to lie in a fixed position on the upstream end 70U of tubular housing 70. Fill-tube connector spud 74 is configured to mate with a fill tube 14 included in filler neck 12.

In illustrative embodiments, spud anchor 72 includes a ring-shaped retainer 76 made, for example, of stainless steel and an O-ring seal 77 made, for example, of nitrile rubber (NBR). Spud anchor 72 is coupled to a tubular housing 70 made of polyoxymethylene (POM) to establish a mechanical joint and a fluid-leak barrier between tubular housing 70 and spud anchor 72.

In illustrative embodiments, retainer 76 is ring-shaped and arranged to extend around a circumference of a middle portion 70M of tubular housing 70 and is coupled to tubular housing 70 using an insert-molding process. This creates a mechanical lock between retainer 76 and tubular housing 70 as suggested in FIG. 3. O-ring seal 77 (or any suitable sealing gasket) is either installed or overmolded onto an exposed portion of the retainer 76 that has been anchored to tubular housing 70. O-ring seal 77 provides a fluid-leak barrier between tubular housing 70 and fill-tube connector spud 74 when spud 74 is later mounted on tubular housing 70 to engage O-ring seal 77.

Fill-tube connector spud 74 is pressed onto tubular housing 70 at a later stage of the manufacturing process to cause the upstream end 70U of tubular housing 70 to pass through central channel 75 formed in fill-tube connector spud 74 until spud 74 mates with the stationary spud anchor 72 coupled to tubular housing 70. Once spud 74 is positioned on upstream end 70U of tubular housing 70, a bottom protruding lock portion 74L of spud 74 is deformed (e.g., by application of heat or using any suitable technique) to move radially inwardly toward an exterior surface of tubular housing 70 and axially toward spud anchor 72 provided by O-ring seal 77 and retainer 76 to mate therewith and establish a mechanical lock between spud 74 and spud anchor 72 and to create a fluid-leak barrier between fill-tube connector spud 74 and spud anchor 72. Tubular housing 70 is made of polyoxyethylene (POM) and spud 74 is made of high-density polyethylene (HDPE)

and these dissimilar materials are mechanically locked to one another by deforming lock portion 74L of fill-tube connector spud 74 to move toward tubular housing 70 and spud anchor 72 and without having to weld fill-tube connector spud 74 to tubular housing 70.

Downstream end 70D of tubular housing 70 carrying inlet check valve apparatus 62 is inserted into interior fuel-storage region 30 of fuel tank 18 through inlet aperture 46 formed in fuel tank 18. Fill-tube connector spud 74 is coupled to fuel tank 18 using any suitable means (e.g., welding) to retain tubular housing 70 in a fixed position relative to fuel tank 18. Fill tube 14 is coupled to fill-tube connector spud 74 to cause a fuel-conducting passageway formed in fill tube 14 to lie in fluid communication with fuel-transfer channel 66 formed in tubular housing 70. In an illustrative embodiment, fill-tube connector spud 74 has a multilayer construction and comprises an EVOH center layer and an HDPE outer layer.

Fuel conductor 16 includes a valve carrier 60 comprising tubular housing 70 and a spud anchor 72 coupled to tubular housing 70 and an inlet check valve apparatus 62 as suggested in FIGS. 2 and 3. Inlet check valve apparatus 62 is coupled to valve carrier 60 and includes a closure 61 that is mounted for pivotable movement between a closed position shown in FIG. 3 and an opened position shown in FIG. 4. In the closed position, fuel and fuel vapor are not allowed to flow between fuel tank 18 and fill tube 14 through fuel conductor 16. However, in the opened position, fuel and fuel vapor are allowed to flow through fuel conductor 16.

Tubular housing 70 included in valve carrier 60 is formed to include a valve seat 64 and a fuel-transfer channel 66 terminating at the valve seat 64 as shown, for example, in FIG. 3. Valve carrier 60 is adapted to be coupled to fill tube 14 and fuel tank 18 as suggested in FIGS. 1, 3, and 4 to conduct fuel from fill tube 14 to fuel tank 18 through fuel-transfer channel 66 during vehicle refueling. Closure 61 of inlet check valve apparatus 62 is pivotable about a pivot axis 63 (see FIG. 4) relative to tubular housing 70 of valve carrier 60 to the closed position as shown in FIG. 3 to engage valve seat 64 to block discharge of fuel from fuel-transfer channel 66 into fuel tank 18. Closure 61 of inlet check valve apparatus 62 can also pivot about pivot axis 63 to the opened position as shown in FIG. 4 to disengage valve seat 64 to allow discharge of fuel from fuel-transfer channel 66 into fuel tank 18.

Tank inlet check valve apparatus 62 comprises a flapper-door valve 68 configured to mate with valve seat 64 provided in tubular housing 70 of valve carrier 60, a valve mover 67 pivotably coupled to tubular housing 70 of valve carrier 60 at pivot axis 63 to carry flapper-door valve 68 toward and away from valve seat 64, and a valve-mover biasing spring 69 as shown, for example, in FIGS. 2, 3, and 4. Flapper-door biasing spring 69 yieldably urges valve mover 67 so as to bias flapper-door valve 68 normally to the closed position shown in FIG. 4. In an illustrative embodiment, flapper-door valve 68 includes an annular sealing gasket made of a fluorosilicone material overmolded onto a valve plate made of a nylon material. Spring 69 is a torsion spring made of a stainless steel material. Valve mover 67 is made of a polyoxymethylene (POM) material.

In the illustrated embodiment, valve carrier 60 includes a tubular housing 70 and a spud anchor 72 comprising retainer 76 and O-ring seal 77 and anchoring to tubular housing 70 in the manner suggested in FIGS. 2 and 3. Tubular housing 70 is made, for example, of polyoxymethylene (POM). Spud anchor 72 is made of a weldable material such as, for example, high-density polyethylene (HDPE) so that it can be welded to fuel tank 18 (also made of HDPE or other compatible plastics material) to support tubular housing 70 in a fixed position in inlet aperture 46 formed in fuel tank side wall 44. Closure 61 of inlet check valve apparatus 62 is coupled to tubular housing 70 for pivotable movement about pivot axis 63 in the illustrated embodiment. Valve mover 67 was designed to be snap-fit to valve carrier 60 in an illustrative embodiment and is made of the same material as tubular housing 70.

Tubular housing 70 includes a pipe 78 having a cylindrical interior wall 80 defining a boundary of fuel-transfer channel 66 as shown, for example, in FIG. 3. One end 81 of pipe 78 is open to receive fuel from fill tube 14. Valve seat 64 is formed at an opposite downstream end 83 of pipe 78 to define an opening through which fuel is discharged from fuel-transfer channel 66 into fuel tank 18 when closure 61 of inlet check valve apparatus 62 is moved to the opened position as shown, for example, in FIG. 4.

Tubular housing 70 also includes an outer sleeve 82 configured to surround a downstream portion of pipe 78, which portion is formed to include valve seat 64, as shown, for example, in FIG. 3. Sleeve 82 includes a proximal end coupled to pipe 78 to retain sleeve 82 in a cantilevered position relative to valve seat 64 as suggested in FIG. 3. A ramped collar 86 forming a sealing barb formed on an upstream end 81 of spud 74 as shown in FIG. 3 for expanding fill tube 14 radially outwardly as fill tube 14 is coupled to fill-tube connector spud 74.

A process of assembling a portion of a fuel tank filler neck in accordance with the present disclosure comprises the steps of providing a tubular housing 70 formed to include a fuel-transfer channel 66 extending from a downstream end 70D thereof to an upstream end 70U thereof and mounting an inlet check valve apparatus 62 on downstream end 70D of tubular housing 70 to regulate flow of liquid fuel and fuel vapor through an outlet 70DO formed in tubular housing 70 to open into fuel-transfer channel 66 as suggested in FIGS. 2 and 3. The process further comprises the step of insert-molding a spud anchor 72 into tubular housing 70 so that it protrudes from an exterior portion of tubular housing 70 to locate spud anchor 72 in a stationary position on tubular housing 70 as suggested in FIG. 3.

In illustrative embodiments, the process further comprises the step of coupling a spud 74 to spud anchor 72 to form a tank mount 71 as suggested in FIG. 3. Tank mount 71 is configured to provide means for mating with a fuel tank 18 to support tubular housing 78 in an aperture 46 formed in fuel tank 18 to position downstream end 70D of tubular housing 70 in communication with an interior fuel-storage region 30 formed in fuel tank 18 and to position upstream end 70U of tubular housing 70 outside of fuel tank 18 to communicate with a fill tube 14 associated with fuel tank 18.

In illustrative embodiments, spud anchor 72 includes a retainer 76 and an O-ring seal 77 as suggested in FIGS. 2 and 3. Retainer 76 includes an inner portion that is embedded in tubular housing 70 to create a mechanical joint and a fluid-leak barrier between tubular housing 70 and spud anchor 72 and an outer portion that is exposed and arranged to extend away from fuel-transfer channel 66 formed in tubular housing 70. O-ring seal 77 is coupled to the outer portion of retainer 76 as suggested in FIG. 3.

Outer portion of retainer 76 has an annular shape and extends around a circumference of and projects radially outwardly away from a cylindrical outer surface defining the circumference of tubular housing 70 as suggested in FIGS. 2 and 3. O-ring seal 77 is overmolded onto outer portion of retainer 76 in an illustrative embodiment. Tubular housing 70 is made of a plastics material such as POM. Retainer 76 is made of a metal material. O-ring seal 77 is made of an elastomeric material such as Fluorosilicon, EPDM, or FKM.

In illustrative embodiments, the coupling step includes the steps of moving spud 74 relative to tubular housing 70 to trap O-ring seal 77 between tubular housing 70 and spud 74 and compressing O-ring seal 77 therebetween to provide a fluid-leak barrier between tubular housing 70 and spud 74. Retainer 76 is located to support O-ring seal 77 in a position to be compressed as suggested in FIG. 3. The coupling step further comprises the steps of passing upstream end 70U of tubular housing 70 through a central channel 75 formed in spud 74 until spud 74 mates with spud anchor 72 and fastening spud 74 to spud anchor 72 to create a mechanical joint and a fluid-leak barrier between spud 74 and spud anchor 72.

The fastening step further includes the steps of positioning spud 74 on upstream end 70U of tubular housing 70 to engage a first side of spud anchor 72, locating a bottom protruding lock portion 74L of spud 74 in close proximity to an opposite second side of spud anchor 72, and deforming the bottom protruding lock portion 74L of spud 74 to mate with the opposite second side of spud anchor 72 to establish a mechanical lock between spud 74 and spud anchor 72 and to create a fluid-leak barrier therebetween.

In illustrative embodiments, the deforming step includes the steps of moving bottom protruding lock portion 74L of spud 74 radially inwardly toward an axis 70A and an exterior surface of tubular housing 70 and axially relative to axis 70A toward the opposite second side of spud anchor 72 toward O-ring seal 77 to trap O-ring seal 77 between bottom protruding lock portion 74L of spud 74, another portion of spud 74 located alongside the first side of spud anchor 72, and tubular housing 70.

The coupling step further comprises the steps of inserting the downstream end 70D of tubular housing 70 carrying inlet check valve apparatus 62 into interior fuel-storage region 30 of fuel tank 18 through the inlet aperture 46 formed in fuel tank 18 and fastening spud 74 to fuel tank 18 to retain tubular housing 18 in a fixed position relative to fuel tank 18. In illustrative embodiments, each of spud 74 and fuel tank 18 is made of HDPE.

The process further comprises the step of coupling fill tube 14 to spud 74 to cause a fuel-conducting passageway 14P formed in fill tube 14 to lie in fluid communication with fuel-transfer channel 60 formed in tubular housing 70 to communicate with interior fuel-storage region 30 in fuel tank 18 when a closure 61 included in inlet check valve apparatus 62 is moved relative to tubular housing 70 from a closed position blocking a downstream fuel-discharge aperture 70DO formed in downstream end 70D of tubular housing 70 to an opened position opening downstream fuel-discharge aperture 70DO formed in downstream end 70D of tubular housing 70.

The invention claimed is:

1. A process of assembling a portion of a fuel tank filler neck, the process comprising the steps of
providing a tubular housing formed to include a fuel-transfer channel extending from a downstream end thereof to an upstream end thereof,
mounting an inlet check valve apparatus on the downstream end of the tubular housing to regulate flow of liquid fuel and fuel vapor through an outlet formed in the tubular housing to open into the fuel-transfer channel,
insert-molding a spud anchor into tubular housing so that it protrudes from an exterior portion of the tubular housing to locate the spud anchor in a stationary position on the tubular housing, and
coupling a spud to the spud anchor to form a tank mount configured to provide means for mating with a fuel tank to support the tubular housing in an aperture formed in the fuel tank to position the downstream end of the tubular housing in communication with an interior fuel-storage region formed in the fuel tank and to position the upstream end of the tubular housing outside of the fuel tank to communicate with a fill tube associated with the fuel tank.

2. The process of claim 1, wherein the spud anchor includes a retainer and an O-ring seal, the retainer includes an inner portion that is embedded in the tubular housing to create a mechanical joint and a fluid-leak barrier between the tubular housing and the spud anchor and an outer portion that is exposed and arranged to extend away from the fuel-transfer channel formed in the tubular housing, and the O-ring seal is coupled to the outer portion of the retainer.

3. The process of claim 2, wherein the outer portion of the retainer has an annular shape and extends around a circumference of and projects radially outwardly away from a cylindrical outer surface defining the circumference of the tubular housing.

4. The process of claim 3, wherein the O-ring seal is overmolded onto the outer portion of the retainer.

5. The process of claim 2, wherein the tubular housing is made of a plastics material, the retainer is made of a metal material, and the O-ring seal is made of an elastomeric material.

6. The process of claim 2, wherein the coupling step includes the steps of moving the spud relative to the tubular housing to trap the O-ring seal between the tubular housing and the spud and compressing the O-ring seal therebetween to provide a fluid-leak barrier between the tubular housing and the spud.

7. The process of claim 1, wherein the coupling step comprises the steps of passing the upstream end of the tubular housing through a central channel formed in the spud until the spud mates with the spud anchor and fastening the spud to the spud anchor to create a mechanical joint and a fluid-leak barrier between the spud and the spud anchor.

8. The process of claim 7, wherein the fastening step further includes the steps of positioning the spud on the upstream end of the tubular housing to engage a first side of the spud anchor, locating a bottom protruding lock portion of the spud in close proximity to an opposite second side of the spud anchor, and deforming the bottom protruding lock portion of the spud to mate with the opposite second side of the spud anchor to establish a mechanical lock between the spud and the spud anchor and to create a fluid-leak barrier therebetween.

9. The process of claim 8, wherein the spud anchor includes an O-ring seal and the deforming step includes the steps of moving the bottom protruding lock portion of the spud radially inwardly toward an exterior surface of the tubular housing and axially toward the opposite second side of the spud anchor toward the O-ring seal to trap the O-ring seal between the bottom protruding lock portion of the spud, another portion of the spud located alongside the first side of the spud anchor, and the tubular housing.

10. The process of claim 9, wherein the spud anchor also includes a retainer having an inner portion that is embedded in the tubular housing to create a mechanical joint and a fluid-leak barrier between the tubular housing and the spud anchor and an outer portion that is exposed and arranged to extend away from the fuel-transfer channel formed in the tubular housing, and the O-ring seal is coupled to the outer portion of the retainer.

11. The process of claim 10, wherein the outer portion of the retainer has an annular shape and extends around a circumference of and projects radially outwardly away from a cylindrical outer surface defining the circumference of the tubular housing.

12. The process of claim 11, wherein the O-ring seal is overmolded onto the outer portion of the retainer.

13. The process of claim 7, wherein the coupling step further comprises the steps of inserting the downstream end of the tubular housing carrying the inlet check valve apparatus into the interior fuel-storage region of the fuel tank through the inlet aperture formed in the fuel tank and fastening the spud to the fuel tank to retain the tubular housing in a fixed position relative to the fuel tank.

14. The process of claim 13, further comprising the step of coupling the fill tube to the spud to cause a fuel-conducting passageway formed in the fill tube to lie in fluid communication with the fuel-transfer channel formed in the tubular housing to communicate with the interior fuel-storage region in the fuel tank when a closure included in the inlet check valve apparatus is moved relative to the tubular housing from a closed position blocking a downstream fuel-discharge aperture formed in the downstream end of the tubular housing to an opened position opening the downstream fuel-discharge aperture formed in the downstream end of the tubular housing.

15. The process of claim 1, wherein after the insert-molding step the spud anchor is located on and arranged to surround a middle portion of the tubular housing midway between the upstream and downstream ends of the tubular housing.

16. A process of assembling a portion of a fuel tank filler neck, the process comprising the steps of providing a tubular housing formed to include a fuel-transfer channel extending from a downstream end thereof to an upstream end thereof, mounting an inlet check valve apparatus on the downstream end of the tubular housing to regulate flow of liquid fuel and fuel vapor through an outlet formed in the tubular housing to open into the fuel-transfer channel, insert-molding a spud anchor into tubular housing so that it protrudes from an exterior portion of the tubular housing to locate the spud anchor in a stationary position on the tubular housing, and configuring an exposed portion of the spud anchor projecting away from the exterior portion of the tubular housing to provide means for mating with a spud coupled to a fuel tank to support the tubular housing in an aperture formed in the fuel tank to position the downstream end of the tubular housing in communication with an interior fuel-storage region formed in the fuel tank and to position the upstream end of the tubular housing outside of the fuel tank to communicate with a fill tube associated with the fuel tank.

17. The process of claim 16, wherein the spud anchor includes a retainer and an O-ring seal, the retainer includes an inner portion that is embedded in the tubular housing to create a mechanical joint and a fluid-leak barrier between the tubular housing and the spud anchor and an outer portion that is exposed and arranged to extend away from the fuel-transfer channel formed in the tubular housing, and the O-ring seal is coupled to the outer portion of the retainer.

18. The process of claim 17, wherein the outer portion of the retainer has an annular shape and extends around a circumference of and projects radially outwardly away from a cylindrical outer surface defining the circumference of the tubular housing.

* * * * *